United States Patent [19]

Kelly, Jr. et al.

[11] 3,976,799

[45] Aug. 24, 1976

[54] METHOD FOR MAKING CARNIVORE FOOD

[76] Inventors: William H. Kelly, Jr., 2047 Granger Road; John R. Kelly, 1961 Granger Road, both of Medina, Ohio 44256

[22] Filed: Feb. 18, 1975

[21] Appl. No.: 550,605

Related U.S. Application Data

[63] Continuation of Ser. No. 55,418, July 16, 1970, abandoned.

[52] U.S. Cl............................. 426/311; 17/32; 425/311; 426/513; 426/516; 426/623; 426/646; 426/805

[51] Int. Cl.²...................... A23K 1/10; A23P 1/00

[58] Field of Search ............ 146/189; 426/311, 516, 426/513, 517, 518, 646, 618, 657, 519, 802, 805, 623, 93; 425/311, 207, 208, 197; 17/32, 45; 18/12.5 M, 12.5 A, 12.5 G

[56] References Cited

UNITED STATES PATENTS

| | | | |
|---|---|---|---|
| 2,339,418 | 1/1944 | McKay | 426/93 |
| 2,558,092 | 6/1951 | Kelly et al | 99/7 |
| 3,311,478 | 3/1967 | Robarge | 426/646 |
| 3,433,647 | 3/1969 | Johnston | 426/513 |
| 3,447,929 | 6/1969 | Hale | 426/513 |
| 3,542,104 | 11/1970 | Anderson | 425/197 |

FOREIGN PATENTS OR APPLICATIONS

370,271  3/1922  Germany ..................... 146/189

OTHER PUBLICATIONS

Mustakas; "Simplifies Full-Fat Soy Flour Process;" Food Eng. 10/1964; Chilton Co., Phila. Pa.

*Primary Examiner*—S. Leon Bashore
*Assistant Examiner*—Kenneth M. Schor
*Attorney, Agent, or Firm*—John Harrow Leonard

[57] ABSTRACT

The carnivore food is composed essentially of ground raw meat and dried cooked cereal, optionally supplemented with other protein, and extruded as continuous extrusions each composed of successive slugs adhered to each other in end to end relation by the natural fluids freed from the meat by cutting and extrusion forces. The amount of cereal is thoroughly impregnated by the freed juices, leaving an excess of freed juices only sufficient to adhere the food particles together and moisten the extrusion. The freed juices of the meat, and supplement, if any, are substantially the only moisture present.

4 Claims, 6 Drawing Figures

U.S. Patent    Aug. 24, 1976    3,976,799
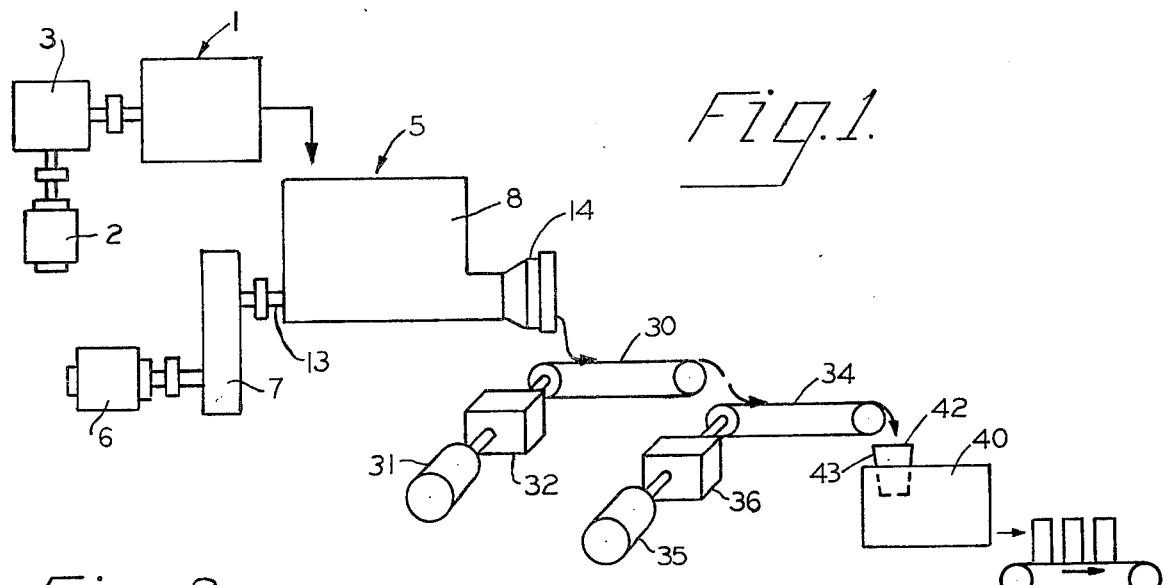
Fig.1.
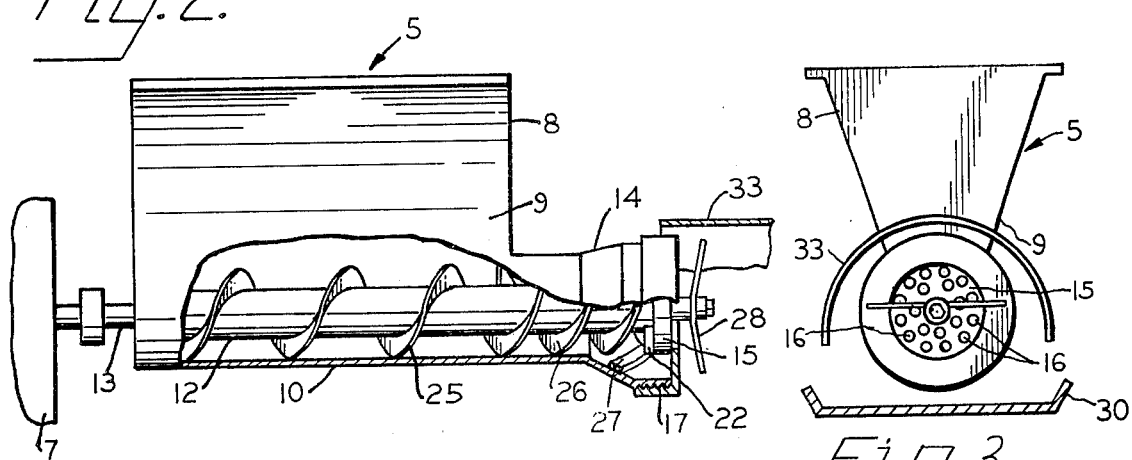
Fig.2.
Fig.3.
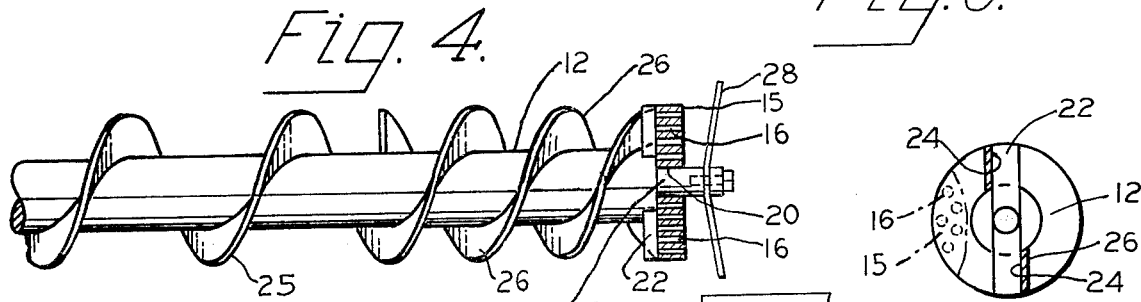
Fig.4.
Fig.5.
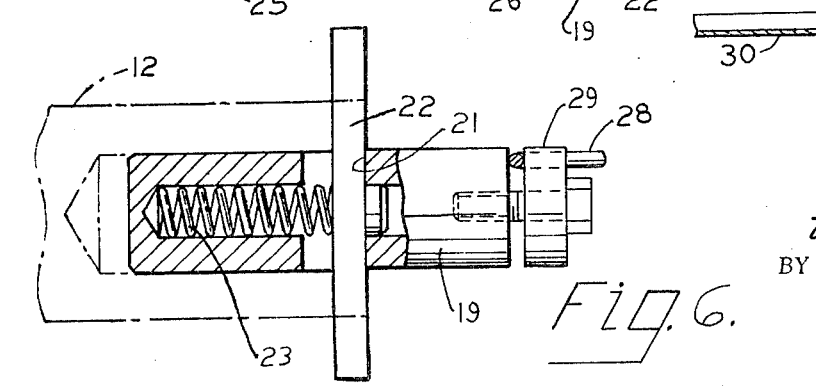
Fig.6.
INVENTOR.
William H. Kelly +
BY John R. Kelly.
John H. Leonard
their ATTORNEY

METHOD FOR MAKING CARNIVORE FOOD

This is a continuation of application Ser. No. 55,418, filed July 16, 1970 and now abandoned.

The extrusion method and apparatus are such that the cutting off of each slug from the mass being fed for extrusion does not unduly shorten or comminute the cut-off strands of meat tissue, but causes them to intertwine about and enmesh the food particles, and thus bind the particles of each slug together mechanically by the tissue as well as adhesively by the freed fluids.

The method is continuous, the extrusions being broken into lengths desired by a positive differential in speed of travel of leading portions of each extrusion relative to its adjacent trailing portion or by a breaking spreader.

The resultant extrusion is frangible, porous, and moist, but firmer and stronger than those heretofore obtainable, so that it lends itself to automated continuous quantity production.

The product is more uniform and palatable than obtainable by prior methods.

This invention relates to a food for carnivores and to a method and apparatus for making the same, and is an improvement on the inventions disclosed in our U.S. Letters Pat. No. 2,558,092, of June 26, 1951.

The food therein disclosed is in the form of frangible, porous, moist, vermiform extrusions broken into short lengths of from ½ inch to 1¼ inch long. It is composed essentially of about equal parts of ground fresh meat and dried precooked cereal, with a small portion of fortifying ingredients added, the cereal being thoroughly impregnated and coated with the meat fluids, and the moisture content being substantially only the natural fluids of the fresh meat.

The prior food was prepared by extruding the mixture through a griding extruder, such as a conventional butcher shop meat grinder, but modified in some respects as hereinafter noted. The prior extruder had the usual ported extrusion plate through which meat was fed by a feed screw supplemented in its feeding function by a rotary knife. The knife was arranged near the feed face of the plate both for intermittently cutting through the mass being fed by the screw and for forcing the mixture through the extrusion passages in the plate. The original plates were originally about 6 inches in diameter and about ⅝ inches thick, with extrusion passages each ⅜ inches in diameter. This structure depended upon final feed by the knives and this, in turn, required a minimum of three or four blades sweeping past the inlet face of the plate for each revoltuion of the feed screw. The blades were about 12/16 inches wide circumferentially.

In their original condition, these grinding extruders did not operate satisfactorily for producing the patented food due to the limited space between adjacent blades for the feed of the mixture and resulting chopping of the strands of meat tissue into too short lengths, coupled with the resistance of the relatively long extrusion passages. Instead, the flow of the mixture was resisted so that the mixture often squeezed back or otherwise ceased to flow properly, and thus was repeatedly chopped and squeezed until too much meat fluid was released and the strands of tissue became so short that they lost their identity as real strands, with the result that the mixture became a gummy or doughy mass almost impossible to force through the extrusion passages or form properly if extruded. This resulted in heating to such a degree that spoilage soon set in.

In order to eliminate these effects, plates which had worn to a thickness of about 7/16 inch were combined with blades which had been sharpened repeatedly so that they were only about 9/16 inch in circumferential extent. With this modification, if great care were exercised, the mixture could be extruded without freeing too much of the natural fluids from the meat and without heating. Undue shortening of the meat tissue was not fully overcome. However, the difficulty of control rendered the operation unadaptable for producing extrusions of consistent quality by automated quantity production methods. Slight errors in manipulation of the rate of feed, the failure to detect incipient "gumming up" and heating, and the like, frequently resulted in a doughy mass which was unsuitable for the type of food intended, and of which the extruded lengths were not sufficiently resistent to massing during subsequent processing, packaging, and final handling, but instead, tended to lose their individual identities.

In the earlier food produced when the method was controlled with extreme care, the meat and cereal of the extrusions were bound together almost entirely by the tackiness and adhesive qualities of the natural fluids of the meat.

The problems presented, therefore, were to produce consistently at a relatively high rate of speed by automated quantity production the type of food contemplated in the patent, with the optimum of the characteristics of quality and consistency in form, and to improve the final product in other respects over that heretofore obtainable.

For this purpose, a number of modifications were made in the extruding apparatus used so as to enable it to perform the steps of the present new method of production, as is more fully disclosed hereinafter.

In accordance with the present invention, firmer and somewhat drier and stronger porous moist extrusions are provided, not only enhancing the quality of the food, but also assuring that the extrusions hold their shapes so that they can be manipulated efficiently during subsequent automatic processing and packaging.

The present food is composed mostly of a mixture of ground meat and dried cooked cereal, with added supplements in a total amount less than either the meat or the cereal. For example, the supplement may be as much as 10%, and essentially protein and vitamens. The dry cooked cereal is present in an amount such that it can be thoroughly impregnated by the natural fluids freed from the particular meat and supplements, as the fluids are being freed during extrusion, leaving an excess of freed fluids only sufficient to act as an adhesive to tack the ingredients together and moisten lightly the final product. The resultant food, when extruded, is broken into final short lengths, each length being composed of a plurality of slugs adhered to each other sufficiently so that the short lengths are held together firmly and retain their respective identities when handled and piled or dropped into the final packages.

The binding of the particles together adhesively as in the patented food, is augmented by assuring that the cut off strands of meat tissue in the extrusions are longer than heretofore, and sufficiently long so that they can be caused to intertwine and penetrate between and enmesh the food particles of the mixture and bind the meat, cereal and supplements together mechanically, as well as adhesively. This results not only in a drier, stronger, and firmer porous extrusion well adapted for subsequent handling, but also in improvement in the quality of the food as to consistency, flavor, and keeping qualities.

The food is extruded without becoming too sticky, gummy, or doughy, on the one hand, or too dry and frangible on the other. If it becomes too sticky it forms an unmanageable mass. If it is too dry, the extrusions break apart inpredictably and tend to spall, and the palatability is decreased. In both instances, the subsequent processing is rendered more difficult.

The present mixture is fed positively entirely to the feed face of the extrusion plate and is extruded at a uniform rate and constant pressure. The cutting off of the mass in the stage of being extruded from the mass being fed for subsequent extrusion is done in a manner which assures that the mass extruded has considerably greater length of strands of meat tissue than were theretofore obtained. The extrusion is done under higher pressure, yet without creation of appreciable heating resulting from frictional resistance to travel of the food by various parts of the extruding apparatus and heat generated by frictional contact between relatively moving parts of the extruder itself. Proper penetration of the cereal by the fluids and enmeshing of the particles by the tissue strands is obtained consistently.

As distinguished from the patented food, method, and apparatus, the meat is coarse ground condition and the dry cooked cereal, along with such supplements as are used, are fed by a special feed screw to the feed face or inlet face of the multi-passage extrusion plate. However, the extrusion plate is not a thin plate as heretofore used, but in an extruder of the size described in the patent, is a plate fully 12/16 inch thick with ⅜ inch diameter holes the same as the unworn plates used in the earlier meat grinders of comparable size with which it was first attempted to make the food of the patent.

The mixture is introduced initially into the throat of an extruder and is fed by a special feed screw through a plurality of extrusion passages concurrently at a predetermined uniform rate and predetermined constant pressure. The supply of the mixture is such that the mass being fed is compact and free from air pockets or cavities which result when an inadequate supply of the material is fed to the feed screw of the extruder. The mixture is fed unidimensionally, in that "squeezing back" of the material from the plate toward the entrance throat of the extruder, opposite to the intended direction of feed, between the feed screw and walls of the feed chamber is eliminated. The pressure is maintained without feed-back or squeeze-back along the entire path through the extruding nozzle and into the extrusion passages themselves. As the mass is being fed it is mechanically intermittently cut off from the material in and passing through each passage so that, as to each passage, the food is extruded as successive individual slugs each of a length about 50 % or more greater than its diameter. The cutting intervals are so related to the rate of feed that the material feeds unidirectionally into and through the extrusion passages continually and smoothly at a uniform rate, whereby strands of meat tissue once cut off are not thereafter cut again or repeatedly and thus comminuted, hashed and ground until they have lost their identites as strands and have become merely short particles or fragments of no further functional significance mechanically. Instead they remain long enough so that they intertwine and interpenetrate between and enmesh large amounts of the particles of the food in the slug of which they form a part.

The amount of material thus severed from the mass and within each extrusion passage is forced through its associated passage endwise and extruded by the pressure applied to its trailing end by the leading end of that part of the mass being forced by the screw to enter that passage and next to be cut off to form the next succeeding slug. The pressure is sufficient to cause the freed natural fluids of meat and supplement of each slug to penetrate the cereal thereof thoroughly with an excess of free fluid sufficient only to cause the particles to adhere superficially, and, at the same time, to cause the strands of meat tissue to intertwine and interpenetrate between and enmesh the particles of food.

At the same time the pressure is such as to cause sufficient superficial adherence of the succeeding slugs to each other in end to end relation so that they extrude from their associated passage as a continuous frangible extrusion which is free from adhesion to, and retains its separate identity from, those of the extrusions, with which it happens to come in contact as they issue from others of the passages.

The cut-off of the slugs being formed from the mass being fed is in fixed relation to the rate of feed. The slugs, being substantially only adhesively tacked together in endwise relation to form the extrusions without substantial intermeshing of the strands of tissue of one slug with the strands and particles of another slug, have planes of weakness where they are adhesively tacked together.

For automated production and packaging, the extrusions are broken into preselected desired lengths, usually equal to the length of three or four slugs, and these broken off lengths spread apart laterally. They are concurrently advanced along a predetermined path at a rate which is adjusted to the rate of extrusion so that the internal stresses due to extrusion and absorption of fluid by the cereal are relieved by the time the extrusions reach a predetermined location.

If the extrusions are advanced as continuous extrusions without break off and spreading, then after they have passed this location, the instantaneous leading portion of each extrusion is advanced at a faster rate than the adjacent trailing portion of extrusion. This rate is such that there is a progressively increasing differential in the distance of travel of the portions that eventually causes the extrusion to be pulled apart into short lengths each of which, for example, is about the length of three or four slugs.

As a result of the improved method, the slugs are firmer and drier and consistently free from gumminess and doughiness, and uniform in quality. the ingredients of each slug are well bonded together by the combination of the adhesiveness of the freed fluids and the intertwining and interpenetration of the resultant much longer strands of tissue than were heretofore obtained. The processing is accomplished without appreciable heating.

An apparatus suitable for performing the method is illustrated in FIGS. 1 through 6, wherein:

FIG. 1 is a flow diagram illustrating the steps of processing the food, including the formation and packaging thereof;

FIG. 2 is an enlarged side elevation, partly in section, of the extruder used in the present invention;

FIG. 3 is a front elevation of the extruder showing the extrusion plate and its orifices;

FIG. 4 is an enlarged side elevation of the feed screw, the knife of the extruder and extrusion plate, showing the interrelation;

FIG. 5 is a front elevation of the structure illustrated in FIG. 4 with the extrusion plate indicated in dot-dasy lines; and FIG. 6 is an enlarged fragmentary view showing the manner in which the knife is mounted for support and driving by the screw.

Referring to the drawings, the coarse ground or chopped meat, dried cooked cereal, and supplements, are fed into a conventional mixer 1 driven by a motor 2 through a positive infinitely variable speed transmission 3, such as the adjustable V-belt and V-pulley type. Within the mixer 1 the ingredients are mixed thoroughly by suitable paddles, not shown, after which the mixture is passed to an extruder 5.

The extruder is driven by a motor 6 through a positive infinitely variable speed transmission 7. The extruder 5 is one having a very large hopper 8 with a large discharge throat 9 at the bottom and through which the food mixture is fed into a feeding and grinding compartment 10. The compartment 10 is essentially cylindrical in shape and extends lengthwise of the hopper.

Within the compartment anc coaxial therewith is a feed screw 12 having a shaft 13 which, at one end, extends to the outside of the extruder and is connected to the transmission 7 for driving at infinitely variable speeds thereby. At the end opposite from the shaft 13, the extruder is provided with an extruding nozzle 14 which, at its inlet end, is of the same diameter as the outlet end of the extruding chamber 10, and which flares outwardly to a larger diameter in the direction of feed of the mixture. Mounted on the outer or discharge end of the nozzle 14 is an extrusion plate 15 having a plurality of extrusion passages 16 arranged with their axes parallel to the axis of the shaft 12. The extrusion plate 15 is held in fixed position on the outer end of the nozzle by the conventional threaded detachable collar 17.

Mounted in the adjacent end of the shaft of the screw 12 is a pin or trunion 19 which, at its outermost end, extends into, and is rotatable in, a suitable bore 20 in the plate 15.

The pin 19 has a suitable transverse slot 21 in which a two bladed cutting knife 22 is mounted for limited movement endwise of the pin. The blades of the knife are of very limited extent circumferentially of the plate and screw and extend radially outwardly to the outermost exposed periphery of the inlet face of the plate 15. It is important that the knife be limited to two blades and that each blade be of limited circumferential extent for assuring that the slug of mixture in the extruding stage in each extrusion passage is longer than was heretofore obtainable even with as thick a plate when the blades of the knife were too close together. The knife 22 is spring biased into contact at its forward edge with the feed face of the plate 15 by a spring 23 in a bore in the pin 19, so as to relieve excess pressures. The discharge end of the screw is provided with radial drive slots 24 in which the knife is disposed and which cause the knife to rotate as a unit with the screw.

The screw 12 is one having a main feeding and extrusion spiral vane 25 and a supplemental feeding and extrusion spiral vane 26 which begins a short distance from the discharge end of the screw and continues to the end. These vanes are arranged so that each convolution of one vane is spaced equidistantly from the adjacent convolutions of the other vane between which it lies. The vanes have the same lead. Both vanes terminate at the feed end of the screw at the inner or feed face of the plate 15, and their terminal ends are spaced 180° from each other about the screw axis.

The knife 22, contrary to those heretofore provided, is not one which is arranged to effect feeding. The feeding is a positive feed obtained by the two vanes of the screw itself, and the knife serves only for severing the mass being fed from that in the extrusion stage in each passage at the time a blade sweeps past the particular passage.

Further, both vanes 25 and 26 are of the so-called cupped type; that is, their outer periphery is cupped over in the feeding direction so that it slightly overhangs the remainder of the feeding face of the vane. This cupped shape combined with the fact that the vanes extend entirely to the feed face of the plate 15 prevent any appreciable squeeze-back of the mixture being fed and thus make possible the maintenance of a continuous constant pressure and rate of feed. The nozzle 14 may have the usual internal spiral blades 27.

As mentioned, the hopper 8 is of large size and has a very large throat extending from the driven end of the screw almost to the inlet end of the extrusion nozzle. Thus, the mixture of food being supplied through the hopper is presented to the screw over a sufficient length of the screw to assure that the screw picks up enough of the food to keep the nozzle completely filled at all times. There is no bridging across of the food with resultant cavities and air pockets in the mass being fed through the nozzle.

Due to the spring 23, the knife 22 is kept against the feeding face of the extrusion plate 15 under sufficient pressure to perform its function, but can relieve excess pressures by moving backward slightly temporarily against the biasing force of the spring 23 should such pressures occur, and thereby reduce a possible heating due to friction of blade against the plate.

If more than two blades are provided in a structure of the size and for illustration, the tissue is cut to such short lengths that it tends to accumulate at the knife, block the entrance to the extrusion passage, heat the product, and produce a doughy mass. With no knives it is practically impossible to effect the extrusion. With the two knives described, however, spaced 180° apart, the tissue strands remain considerably longer and the mass is not beaten up into a doughy or gummy substance.

Three or more blades heretofore were necessary as a practical way to feed without heating by too high a speed of rotation of the screw. On the other hand, two blades would feed too slowly if used for feeding as well as cutting. Hence the present extrusion screw has to be one which feeds entirely to the inlet face of the plate independently of the blades, so that the proper amount of food can be pressed against the plate and allow sufficient time, between cut-offs by the knife blades, to squeeze the mass so that the fluids are released and penetrate the cereal and so that the long strands of fiber enmesh and intertwine among the particles. The greater thickness of the plate assures proper compaction throughout the slug, inasmuch as the longer passages impose a greater resistance to extrusion, and render the extrusion more uniform.

A multiplicity of blades in effect causes a hashing and grinding of the strands of tissue so they lose their identity as strands and become merely relatively short particles of tissue.

Further, the two blades and screw arrangement assure the elimination of squeeze-back, the positive feed entirely to the plate, and that the tissue strands cut free by one blade are cut only that once and not repeatedly. If the rotation of the screw is too fast, there will be an improper feed and skip areas as the result of its inability to pick up the food properly. Further, excess rotation develops frictional heat between the plate and blades and among the particles of the food itself.

In the form illustrated, the hopper 8 is about 20 inches long by 12 inches wide and, including the depth of the chamber 10, about 15 inches deep. The extrusion plate is about 7 inches in diameter and 12/16 inch thick with extrusion passages ⅜ inch in diameter. The lateral swinging of the hopper is mechanically tied to the intermittent advance of the two rows of containers, and thus the hopper is always discharging into a package in one row or the other, which package is stationary at the time of hopper discharge. The packages are discharged from the packaging machine 40 onto a suitable conveyer which conveys them to points of storage or further processing.

By the regulation of the screw and transmission 7, the rate of feed and extrusion can be controlled, the pitch or lead of the screw being fixed. The rate of extrusion is chosen for the optimum quality. However, after the extrusions issue from their respective extrusion passages, they tend to bend downwardly and contact each other laterally. They are sufficiently firm so as to maintain their individual identities without adhering even though they are extruded in closely spaced relation as a group. The extrusions are continuous.

To assure that the extrusions are formed into lengths within the range desired for facilitating packaging without clogging the hopper of the packaging machine, a breaking spreader in the form of a rod 28, preferably circular in cross section, is provided. The front end of the pin 19 extends forwardly beyond the extrusion plate 15; for example, in the form illustrated, about three quarters of an inch to an inch. The rod 28 is clamped against the end of the pin 19 for rotation therewith in fixed relation thereto by suitable means, such as a bolt seated clamping washer 29. The rod, at the opposite ends of the clamped portion, is bent forwardly from the plate 15 so that, at the outer periphery of the plate the ends of the rod are about 1-½ inches forwardly from the plate.

The unclamped or breaking portions of the rod 28 are preferably straight from the periphery of the pin 19 to their outer ends, and terminate outwardly, radially of the plate 15, about 1-½ inches beyond the periphery of the plate.

As the rod 28 is rotated with the pin 19, the breaking portions sweep across the path of the extrusions issuing from the plate and break the extrusions into lengths. Since the rate of rotation of the rod is the same as that of the knife blades, the broken off portions are substantially equal in length.

The reason for the forward outward slope of the breaking portions is that, if the rod 28 is parallel throughout its length to the forward face of the plate 15, the extrusions tend to be churned about and to clump up into a doughy mass between the plate and path of the rod 28 instead of breaking clean.

As mentioned, the rod 28 is preferably circular in cross section. This is to assure that a blunt or rounded leading surface is presented to the extrusions for breaking them into lengths and spreading them without penetrating them. Thin blades presented edgewise as a breaker are unsatisfactory as they tend to penetrate into the extrusions instead of breaking them off without substantial penetration with the result they pull the fibrous meat tissue out of the extrusions, causing a deposit of tissue to build up and accumulate on the blade so that it malfunctions. This phenomenon is aggravated by the drag imposed on the extrusions by the wide lateral faces of such a blade. Further such blades do not impel and spread the severed lengths laterally of the extrusion path.

The circular cross section assures a blunt leading surface regardless of variations in the rotated position of the rod about the axis of its clamped portion when it is installed and clamped.

The rod 28 may be clamped in various adjusted positions about the axis of the pin 19 relative to the cutting blades 22.

Not only does the rod 28 break off, as distinguished from cutting off, the length of extrusions, it also impels them radially outwardly and thus spreads them laterally of their path of travel. The distance travelled by each increment of length of the breaking portions is different depending on its distance out from the axis of rotation of the pin 19, the speed near the pin being relatively low and that at the the outer ends being much greater. Thus the lengths of the extrusion broken off near the axis tend to drop vertically, those progressively farther out are thrown progressively farther out laterally of the path of extrusion. Consequently the lengths fall onto a belt conveyer 30, or onto a tray if desired, in well spread condition. If required, depending on the width of the belt conveyer 30, a deflecting hood 33 may be provided in overhanging relation to the path of the extrusions to assure that they fall onto the conveyer.

In order to allow the extrusions to relieve the internal stresses and to set up by absorption of the fluids, as desired, the belt of a conveyer 30 is driven by a motor 31 through an infinitely variable speed transmission 32. The speed of the conveyer 30 is timed to the rate of extrusion, with an allowance made for the fact that the extrusions tend to elongate slightly as the internal stresses created by extrusion and absorption of free fluids relieve themselves. This can be compensated readily so that the broken off lengths are spread apart both laterally and endwise of the conveyer. After the extrusions have remained on the conveyer 30 long enough to set, they can then be discharged therefrom.

For some purposes they can be broken into lengths by pulling them apart by the use of a second conveyer. To function in this manner the unbroken extrusions are discharged from the conveyer 30 onto a conveyer 34 driven by a motor 35 through a variable speed transmission 36. The lineal speed of the conveyer 34 is greater than that of the conveyer 30. As the extrusions pass onto the conveyer 34, the progressively increasing differential in travel by which the leading portion of an extrusion on the conveyer 34 exceeds that of the trailing portion of the same extrusion on the conveyer 30 causes the leading portion to pull apart from the trailing portions intermittently. Usually this occurs at the juncture or plane of weakness at which two slugs are adhesively held together. The actual lengths of the broken off portions of the extrusion are proportional to the differential in speed of the conveyers 30 and 34.

This breaking of the extrusions into shorter lengths, or lengths desired for packaging, is done without any interruption of travel and without expensive flying cut-offs and the like.

In either event, the broken off lengths of the extrusions are discharged from the conveyer 34 into a packaging machine 40 in which the containers for the food are fed in two rows, side by side, in timed relation to the rate of discharge from the conveyer 34 so that each container is filled with the proper amount of food. Preferably this is done by feeding from the belt 34 into a hopper 42 which can be swung intermittently laterally about a horizontal axis extending endwise of the container conveyer so as to dispose its discharge end 43 alternately over each of two adjacent laterally spaced rows of containers. The rows advance alternately intermittently so that one container is always at rest in filling position in one row or the other. Thus there is no carry over from the hopper as a filled container is advanced and before the next container has moved up to its filling location.

The lateral swinging of the hopper is mechanically tied to the intermittent advance of the two rows of containers and thus the hopper is always discharging into a package which is stationary at the time of hopper discharge.

The packages are discharged from the packaging machine 40 onto a suitable conveyer which conveys them to points of storage or further processing.

If desried, the lengths of extrusions may be heat treated, chilled, or frozen before final packaging, depending upon the particular requirements of the trade.

As the result of using the present structure, a substantially continuous process, beginning with the coarse ground meat and dried cooked cereal mixture and ending with the packaging is provided. Further, as a result of a manner of extrusion and feeding with the proper mechanical cut-off of the individual slugs, the fluids and tissue are worked well into the mass with a uniformity such that each slug has substantially the same balance of the formulated food as the others.

Having thus described our invention, we claim:

1. The method of making a carnivore food comprising:

making a mixture consisting essentially of about equal parts of coarse ground, or chopped, fresh meat and dry precooked cereal particles to which is added supplements consisting essentially of vitamins and proteins, in an amount from 0% to about 10% of the total meat and cereal mixture;

confining the mixture and, while it is confined, advancing the mixture unidirectionally along a path as a compact mass, at a uniform rate and under relatively constant pressure, and substantially free from air pockets and cavities and free from appreciable squeeze back, doughiness and gumminess, to the entrances of extrusion passages by mechanical pressure effected by a means which is non-edible and applied to the mixture at locations which advance along said path with the material;

continuously forcing portions of the mixture, in succession, into and through said extrusion passages by maintaining said application of mechanical pressure up to a final location which is immediately adjacent the entrances of passages, so as to force the mixture, free from feedback, unidirectionally through the extrusion passages by said mechanical pressure directly applied to the mixture immediately adjacent the entrances of the passages;

maintaining the portion of the mixture in advance of, and up to, the entrances of said passages with the tissue strands of said coarse ground, or chopped, meat free from cutting of the individual strands during said advance of the mixture up to said entrances, and intermittently, at regular intervals in timed relation to the advance, cutting off said advancing mixture, immediately adjacent said entrances, from the mixture in said passages; while said non-edible means is effecting mechanical pressure immediately adjacent said entrances;

immediately after each cutting operation, causing successive portions of the advancing mixture to be forced into said passages in like manner to the preceding portions, and to be engaged with the trailing ends of the mixture in the passages, with sufficient pressure to force the mixture in said passages to pass therethrough;

maintaining the resistance to extrusion through said passages sufficiently high to cause the mxiture entering the passages after each cutting to adhere superficially to the trailing ends of the cut-off material in the passages and to produce elongated moist, frangible, individually firm extrusions, free from gumminess and doughiness, and each of which extrusions is a succession of individual slugs superficially adhered together at their ends, respectively, and each of which extrusions is of a consistency such that it can retain its separate identity from others concurrently being extruded if brought into contact therewith;

controlling the moisture consistency of the extrusions by controlling the feed composition;

maintaining the rate of feed, extrusion, and cutting such that the material is not appreciably heated, and such that the meat fluids can penetrate into the cereal, and such that the individual tissues fo the coarse ground or chopped meat originally introduced are generally free from more than a single cutting during the advance and extrusion thereof.

2. The method according to claim 1 wherein the mixture is cut off at intervals relative to the rate of feed and each cutoff slug in each passage is confined laterally during its extrusion through its associated passage, the length and diameter of the passage and intermittent cutting off of the mixture at the entrances are related so that each resultant slug has a length of at least about one and one-half times its maximum cross sectional dimension.

3. The method according to claim 1 including the further step of breaking off, successively, portions of the continuous extrusions, without penetrating the interior thereof, immediately after the issuance of the extrusions from said passages, into lengths each of which is equal to at least the length of several successive adhered slugs, and concurrently with said breaking off, spreading the lengths apart laterally different distances from each other by applying mechanical pressure intermittently and successively to the outer surfaces of the extrusions, respectively, laterally thereof, at a location close to, but beyond, the outlets of said passages.

4. The method of extruding a carnivore food consisting essentially of a mixture of about equal parts of raw fresh meat and dried cooked cereal, part of the meat being muscle meat and part being organ meat, by means of a meat grinder of spiral vane screw feed type having a body with a passage in which the mixture is introduced near one end and along which it is feed fed by the screw vanes to, and through, extrusion passages in an extrusion plate at the other end of the body, and comprising:

driving the mixture through said passage by rotating the screw while maintaining the spaces between the screw vanes, throughout the length of the passage, filled with the mixture and substantially free from air pockets and cavities;

unidirectionally advancing the confined mixture, as a compact mass and free from feedback, doughiness and gumminess, by mechanical pressure applied by direct contact of the screw vanes and the mixture at advancing locations along the length of the screw and passage, the last of which locations is immediately adjacent the inlet face of the plate and such that the screw vanes extend to a location immediately adjacent the inlet face of the plate;

maintaining the rate of advance substantially uniform and the pressure on the mixture substantially constant by controlling the rate of rotation of the screw;

continuously forcing the mixture into said extrusion passages, substantially free from feedback, by the force applied by contact of the screw vanes to those portions of the mixture delivered to the entrance of the extrusion passages;

maintaining predetermined extrusion pressure by employing extrusion passages having a length to diameter ratio such that the material in the passages is subjected to sufficient pressure to cause the fluids in the meat of the mixture to penetrate the cereal;

further controlling the moisture consistency of the extrusions by controlling the ratio of muscle meat to organ meat in the mixture introduced into said passage; and intermittently cutting off the mixture in the extrusion passages from the mixture being fed to the extrusion passages twice only for each revolution of the screw, and immediately adjacent said inlet face of the plate maintaining the resistance to extrusion through said passages sufficiently high to cause the mixture entering the passages after cutting to adhere superficially to the trailing ends of the cut-off material in the passages.

* * * * *

UNITED STATES PATENT OFFICE
CERTIFICATE OF CORRECTION

PATENT NO. : 3,976,799
DATED : August 24, 1976
INVENTOR(S) : William H. Kelly, Jr. & John R. Kelly It is certified that error appears in the above-identified patent and that said Letters Patent are hereby corrected as shown below:

Col. 1, Paragraphs 2, 3, 4, and 5, covered in lines numbered 5 through 22, beginning --The extrusion method-- and ending --obtainable by prior methods.-- should be read as part of the Abstract, page 1, of the patent, after "presented." line 12.

Col. 1, line 48, for "3/8" read --11/16--.
Col. 3, line 29, for "is" read --in--.
Col. 5, line 7, for "dot-dasy" read --dot-dash--.
Col. 5, line 27, for "anc" read --and--.
Col. 10, line 40, for "fo" read --of--.

Signed and Sealed this

Thirtieth Day of November 1976

[SEAL]

Attest:

RUTH C. MASON
Attesting Officer

C. MARSHALL DANN
Commissioner of Patents and Trademarks